United States Patent [19]

Bordignon

[11] Patent Number: 4,639,967

[45] Date of Patent: Feb. 3, 1987

[54] TAPE WIPING BRUSH, PARTICULARLY FOR MAGNETIC TAPE CASSETTES AND THE LIKE

[75] Inventor: Abramo Bordignon, Senago, Italy

[73] Assignee: A.T.B. S.p.A., Senago, Italy

[21] Appl. No.: 589,422

[22] Filed: Mar. 14, 1984

[30] Foreign Application Priority Data

Apr. 14, 1983 [IT]  Italy ............................... 20596 A/83

[51] Int. Cl.$^4$ .............................................. G11B 23/04
[52] U.S. Cl. .................................... 15/256.5; 360/137; 369/72
[58] Field of Search ................. 15/256.5, 256.51, 100; 355/15; 101/425; 360/137; 369/72

[56] References Cited

U.S. PATENT DOCUMENTS

| | | | |
|---|---|---|---|
| 3,616,478 | 11/1971 | Martz et al. | 15/256.5 X |
| 3,848,992 | 11/1974 | Smith | 15/256.51 X |
| 3,881,195 | 4/1975 | Ono et al. | 15/256.5 X |
| 4,324,014 | 4/1982 | Stutz et al. | 15/100 X |
| 4,407,219 | 10/1983 | Dellevoet | 15/256.51 X |
| 4,458,281 | 7/1984 | Kara | 360/137 X |

Primary Examiner—Edward L. Roberts
Attorney, Agent, or Firm—Guido Modiano; Albert Josif

[57] ABSTRACT

The brush comprises a flexible reed having a mounting portion for attachment to the cassette such that the reed can be held adjacent the tape path, a tape contact zone being provided at the opposite end to the mounting portion having a contact liner adhering on one side of the reed and having a flap extending, at the opposite end to the mounting portion, beyond a tape contacting edge.

8 Claims, 6 Drawing Figures

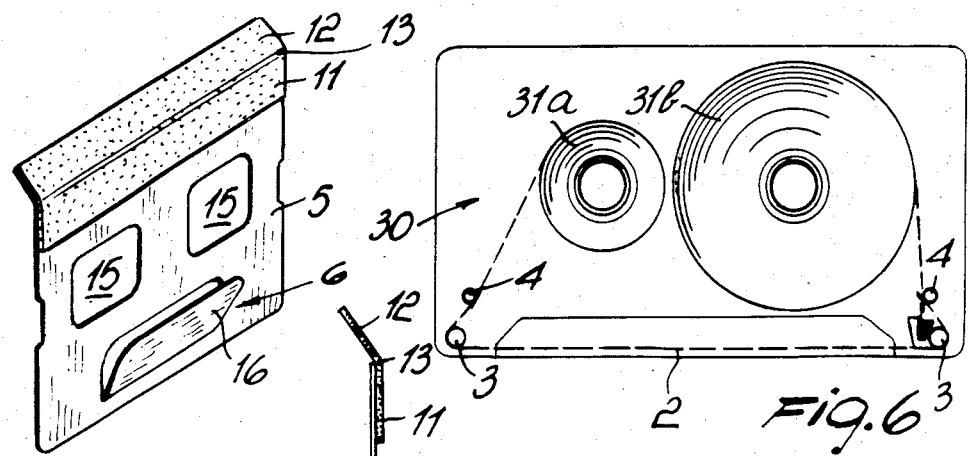
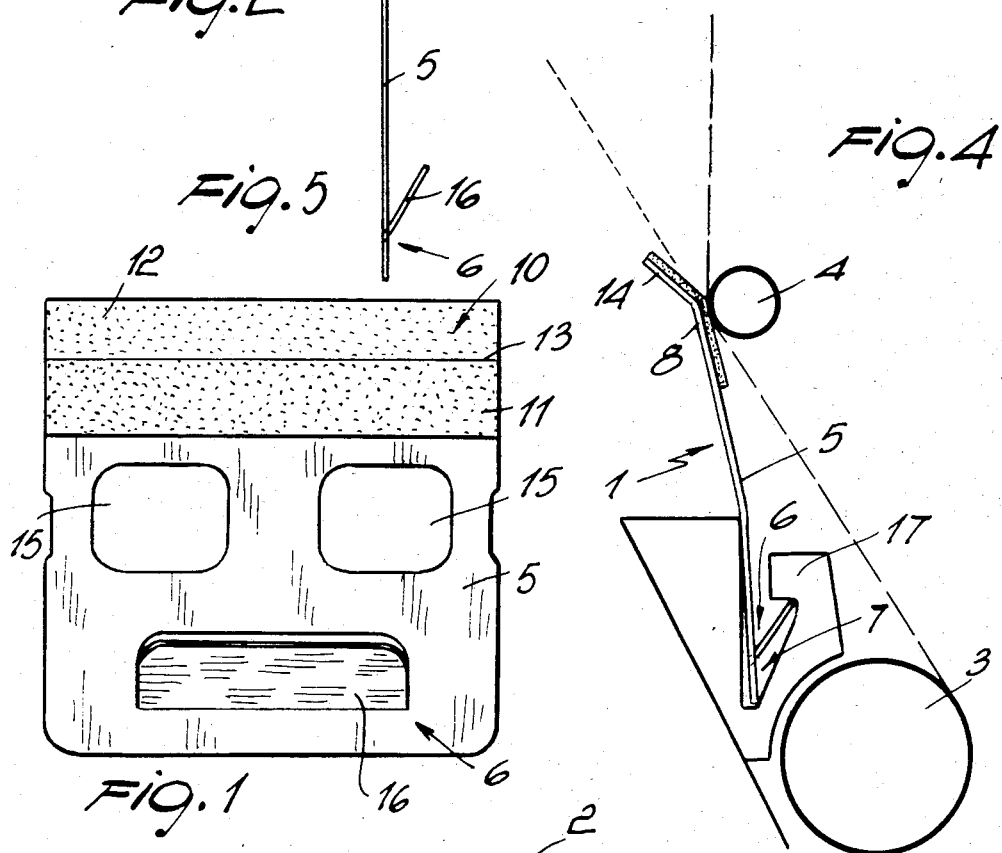
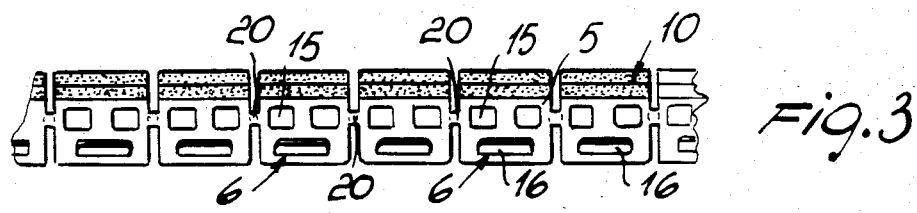

TAPE WIPING BRUSH, PARTICULARLY FOR MAGNETIC TAPE CASSETTES AND THE LIKE

BACKGROUND OF THE INVENTION

This invention relates to a tape wiping brush particularly for magnetic tape cassettes and the like.

It is known to arrange, in magnetic tape cassettes, tape wiping brushes which are set tangentially to the tape path and have a contact zone intended to rub against the tape.

The brush generally comprises a flexible reed or lamina the sides of which are covered, at the contact zone, with a liner made of a material having a low friction coefficient and high electric conductivity.

Such materials, owing to their special properties, are supplied at a high price, and, accordingly, represent the most expensive single item in the economy of a tape wiping brush; moreover, they have to envelope both sides of the flexible reed at the contact zone because, owing to the contact occurring at a narrow end area of the contact edge, the tape would tend to form a sharp edge on the brush if the latter is fitted with a liner on just the contact side of the reed.

Wiping brushes are generally attached to magnetic tape cassettes by means of an adhesive applied on the mounting portion area; alternatively, brushes may be snap-fitted into specially provided seats, but, in this case, the mount may develop problems of stability, and anyhow the flexible reed manufacture is bound to have increased material consumption requirements.

Furthermore, the glueing technique hinders an automated installation of the brushes in the cassettes, and significantly complicates the tape wiping brush manufacturing technologies.

SUMMARY OF THE INVENTION

Accordingly, the task of the present invention is to obviate such prior deficiencies by providing a tape wiping brush which can simplify the brush manufacturing procedure while affording a considerable saving in the brush liner material.

Within that task it is an object of the invention to provide a tape wiping brush which can be more easily assembled within a magnetic tape cassette.

It is another object of the invention to provide a tape wiping brush which can make its automated installation in magnetic tape cassettes a feasible, convenient, and comparatively simple process.

Still another object of the invention is that of simplifying the manufacturing of tape wiping brushes.

Yet another object of the invention is to provide a tape wiping brush which can afford a reduction in the assembly time of a magnetic tape cassette while ensuring the highest degree of protection for the magnetic tape.

According to one aspect of the invention the mentioned task and objects as well as yet other objects are achieved by a tape wiping brush, particularly for magnetic tape cassettes and the like, comprising a flexible reed extending over a substantially flat length and defining, at opposed ends, a mounting zone for attachment to a cassette and a tape pressure zone having a contact liner attached thereto, characterized in that said contact liner has a flap extended past a tape contacting edge at the opposite end to said mounting zone.

Advantageously, said flexible reed may have, at said contacting zone, a fold line formed therein which extends in a substantially orthogonal direction to the direction of movement of said tape to define a portion which slopes away from said tape, said flap being attached to said sloping portion.

BRIEF DESCRIPTION OF THE DRAWINGS

Further features and advantages of the invention will be more clearly understood from the following detailed description of two preferred, though not exclusive, embodiments of this tape wiping brush, as illustrated by way of example only in the accompanying drawings, where:

FIG. 1 is a plan view of the tape wiping brush according to the invention;

FIG. 2 is a perspective view thereof;

FIG. 3 shows several tape wiping brushes in plan view, as manufactured for automated installation in magnetic tape cassettes;

FIG. 4 is a detail view of the area of installation of this tape wiping brush in a magnetic tape cassette;

FIG. 5 illustrates a further embodiment of the tape wiping brush according to the invention; and FIG. 6 shows diagrammatically in plan view a magnetic tape cassette.

DESCRIPTION OF THE PREFERRED EMBODIMENT

Making reference to the drawing views, the tape wiping brush according to this invention is generally designated with the reference numeral 1.

Shown schematically in FIG. 4 is a detail of a videocassette 30, wherein a magnetic tape 2 which is wound and unwound on a pair of reels 31a–b is run over a deflector roll 3 to reach a zone of contact with the tape wiping brush, where it undergoes a deflection by a roller 4 which is adapted to keep the incidence angle of the tape on the brush 1 constant.

The brush itself, shown to advantage in FIG. 1, comprises essentially a flexible reel or lamina 5 on which there is formed a mounting zone 6 which fits in a seat 7 in the magnetic tape cassette and is shaped to hold the brush at an area adjacent the tape path, it being held pressed elastically thereon at the roller 4.

In that position, the reel or lamina will define a pressure zone or tape facing surface 8 for the cited tape, the wall whereof which faces the roller 4 has a contact liner 10 applied thereon which is preferably formed of a material having a low friction coefficient and a high electric conductivity.

In accordance with this invention, the contact liner has a first zone 11 attached to a substantially flat section of the flexible reed, which zone defines a tape contacting surface terminated with a contact edge 13 extending in a substantially orthogonal direction to the tape direction of motion. A further surface of the liner is continued past said edge and is defined by a flap 12 at the opposite end with respect to the mounting zone. As clearly visible in the drawing the back surface of the lamina 5 is left uncovered i.e. free.

The flexible reed is preferably formed, at the contact edge, with a fold line being coextensive with the contact edge and defining on the reed a sloping or bent portion 14 which diverges away from the tape to form with the plane containing the flexible reed an angle in the 1° to 89° range, preferably selected in the 25° to 35° range.

The flap 12 is preferably attached to the sloping portion and supported thereby to achieve the same inclination relatively to the tape.

The flexible reed is formed, at the section thereof included between the mounting zone and tape pressure zone, with windows 15 which, by reducing the effective cross-section area of the reed 5, improve its flexing characteristics while lowering the pressure exerted by the same on the magnetic tape.

Of preference, the reed is provided at the mounting zone with a tab 16 which is cut so that it can be inclined on the plane of the reed to diverge from said plane toward the tape pressure zone; also in a preferred embodiment, the tab protrudes from the reed plane on the side of the contact liner and engage, once it has been mounted in the seat 6 of the cassette, with a detent dog 17.

The aforesaid mount can obviate the glueing operation, as carried out conventionally at the mounting zone, which is known to be labor-consuming and to restrict the possibility for automation of the magnetic tape cassette manufacturing steps.

As shown in FIG. 3, the brushes may be produced in the form of a continuous web wherein they are interconnected by means of cross-pieces or bridges 20 which can be severed by the machine station whereat the tape wiping brush is inserted in the magnetic tape cassette.

The continuous brush web may, therefore, be easily stored in coils, and its supply to the automated machine be facilitated.

Furthermore, and as shown in FIG. 5, this tape wiping brush may be formed without the sloping portion, in which case the flap of the contact liner would be left projecting freely past the contact edge.

The operation of the tape wiping brush according to the invention is evident from the foregoing description and illustration, and in particular, the tape 2 runs, at the section included between the roll 3 and roller 4, in a direction which is determined by the mutual positioning of the cited roll and roller.

The location of the seat 7 is selected such that the contact liner is held pressed onto the tape by virtue of an elastic deformation of the flexible reel or lamina which is preset during the cassette assembly step.

Depending on the filling condition of the magnetic tape coil in the cassette, the tape will lay along either of the paths shown in dash lines in FIG. 4, downstream of the roller, and in either case the tape will be kept engaged with a zone substantially adjoining the contact edge of the liner 10.

Thanks to the sloping portion of the flexible lamina to reed, the contact liner flap adhering thereon inhibits the occurrence of interfering phenomena between said liner and the magnetic tape, thus providing for the cassette optimum operating conditions.

As the tape is being unwound or wound in the cassette, the brush is held in position by the tab 16 engaging in the seat 7, thus eliminating all problems from separation or dislodgement of the brush from its seat.

The invention as described is susceptible to many modifications and variations without departing from the scope of its principle. Moreover, all of the details may be replaced with other, technically equivalent elements.

In practicing the invention, the materials used and the dimensions and contingent shapes may be any selected ones to meet individual requirements and depending on the state of the art.

I claim:

1. A tape wiping brush, particularly for magnetic tape cassettes and the like, comprising a flexible reed extending over a substantially flat length and defining, at opposed ends, a mounting zone for attachment to a cassette and a tape pressure zone having a contact liner attached thereto, characterized in that said contact liner has a flap extending along a tape contacting edge at the opposite end to said mounting zone, said flexible reed being formed, at said contact edge, with a fold line extending in a substantially orthogonal direction to the direction of movement of said tape to define a portion sloping away from said tape, said flap being secured on said sloping portion of said reed.

2. A tape wiping brush according to claim 1, said mounting portion of said reed being adapted for coupling to a seat on said magnetic tape cassette, comprising at least one tab extending over a substantially middle section of said mounting portion and being inclined on the plane containing said flexible reed to diverge away from said plane toward said pressure zone on the same side as said contact liner.

3. A tape wiping brush according to claim 1, characterized in that said sloping portion diverges away from said tape with respect to the plane containing said flexible reed by an angle in the 1° to 89° range.

4. A tape wiping brush according to claim 1, characterized in that said sloping portion diverges away from said tape with respect to the plane containing said flexible reed by an angle in the 25° to 35° range.

5. A tape wiping brush according to claim 1, comprising, formed in said flexible reed between said mounting zone and said tape pressure zone, windows effective to improve the flexing properties of said reed.

6. A package of tape wiping brushes of the type according to claim 1, characterized in that a plurality of such brushes are arranged side-by-side and similarly oriented, adjacent brushes being mutually connected by crosspieces to form a continuous wiping brush web.

7. A tape wiping device, particularly for magnetic tape cassettes and the like, comprising a lamina having one end portion thereof defining a mounting zone for attachment to a cassette, remote from said mounting zone another end portion of said lamina defining a tape facing surface on one side of said lamina and a back surface on the opposite side of said lamina and a wiping liner covering said tape facing surface and leaving free said back surface, said wiping liner having a tape contacting surface portion and a further surface portion departing from said tape contacting surface portion in a direction away from said mounting zone, said further surface portion forming an angle with respect to said tape contacting surface portion at least in an operative condition of said wiping device.

8. A device according to claim 7, wherein said further surface portion of said wiping liner defines a flap formation of said wiping liner extending beyond said another end portion of said lamina.

* * * * *